(12) United States Patent
Middendorf et al.

(10) Patent No.: US 9,109,577 B2
(45) Date of Patent: Aug. 18, 2015

(54) METHOD AND SYSTEM FOR OPERATING A WIND TURBINE

(75) Inventors: Joerg Middendorf, Holdorf (DE); Timothy Botsford Cribbs, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 13/038,490

(22) Filed: Mar. 2, 2011

(65) Prior Publication Data
US 2011/0213590 A1    Sep. 1, 2011

(51) Int. Cl.
*G06F 15/00* (2006.01)
*F03D 7/04* (2006.01)
*F03D 11/00* (2006.01)

(52) U.S. Cl.
CPC ............ *F03D 7/042* (2013.01); *F03D 11/0091* (2013.01); *F05B 2230/80* (2013.01); *F05B 2270/708* (2013.01); *Y02E 10/722* (2013.01); *Y02E 10/723* (2013.01)

(58) Field of Classification Search
USPC ........................................................ 702/184
See application file for complete search history.

(56) References Cited

U.S. PATENT DOCUMENTS

| | | |
|---|---|---|
| 2004/0019391 A1 | 1/2004 | Ferraz et al. |
| 2008/0150282 A1* | 6/2008 | Rebsdorf et al. ................ 290/44 |
| 2009/0005884 A1 | 1/2009 | Ikegami et al. |

OTHER PUBLICATIONS

Andrew Kusiak, Analysis of Wind Turbine Vibrations Based on SCADA Data, Aug. 2010, vol. 132 / 031008-1, Journal of Solar Energy Engineering p. 1-12.*
Asif Saeed, Online Condition Monitoring System for Wind Turbine case study, Blekinge Institute of Technology, School of Engineering, Department of Applied Signal Processing, Oct. 2008, 79 pages.*
Unofficial English translation of Office Action issued in connection with corresponding CN Application No. 201010165304.5 on Apr. 28, 2015.

* cited by examiner

*Primary Examiner* — Tung S Lau
(74) *Attorney, Agent, or Firm* — Global Patent Operation; Douglas D. Zhang (57) ABSTRACT

A method for operating a wind turbine includes receiving a value of a sensor and comparing the value with a reference, determining depending on the comparison between the value with the reference whether a malfunction of the wind turbine is present; determining the cause of the malfunction of the wind turbine depending on at least one of: the sensor type or the measured value, wherein the cause determination includes: automatically creating a first list including at least one possible cause of the malfunction depending on the sensor type or the measured value; and automatically creating a second list including a sequence of at least two steps, wherein a first step of the second list is based on the a cause selected from the first list and a second step of the second list is automatically determined based on a result of the first step.

10 Claims, 4 Drawing Sheets

METHOD AND SYSTEM FOR OPERATING A WIND TURBINE

BACKGROUND OF THE INVENTION

The subject matter described herein relates generally to a method and a system for operating a wind turbine, a method for repairing a wind turbine. Further, the subject matter concerns a wind turbine comprising such a system.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity. However, malfunction may occur during operation of the wind turbine. Some malfunctions may deteriorate the annual energy production. Other malfunctions may lead to a complete stop of the wind turbine. Some malfunction may be based on a software failure and a restart of the wind turbine, the wind turbine software or one of the wind turbine controllers may redress the malfunction. However, other malfunctions cannot be remedied by such an auto reset, restart or reboot, because they are based on faults of specific devices, for example hardware faults. It is important for an operator of a wind turbine to determine the respective cause of the wind turbine.

Typically, many functions of technical units are usually displayed to a user via fault codes or error messages. These messages are often cryptic and may potentially consist of multiple different root causes. A service technician must then diagnose the actual root cause from his experience or by trial and error. For example, the service technician may follow a trouble shooting procedure consisting of reviewing trouble shooting guides and going through a complex process of validating, measuring and inspecting components of the system, in particular of a wind turbine, to find the real root cause.

Going through fault handling procedures is time consuming and requires good educated personal. For example, a guideline may include steps like switching a contactor and measuring a feedback signal, verifying whether the parameter settings are correct, verify internal software life values like wind speed and temperature, call and communication with remote control center, starting a defined test procedure, and checking a wire connection. Such steps require generally technical knowledge.

The order of inspections has a big influence on the efficiency of trouble shooting. In case of a fault of a motor protection switch, a technician may call a remote center to ask about a frequency of the fault. Then, the remote center sets a specific parameter. In the following, the technician is ordered to do a reset and to check whether a default is resettable. This shows that such procedures are time consuming and need a lot of expertise. However, if the technician has done the work in another sequence it may take longer to find the cause of the malfunction of the wind turbine.

BRIEF DESCRIPTION OF THE INVENTION

In one aspect, a method for operating a wind turbine is provided. The method includes: (a) monitoring a wind turbine including: receiving at least one value of at least one sensor and comparing the at least one value with at least one reference; and, determining depending on the comparison between the at least one value with at least one reference whether a malfunction of the wind turbine is present; (b) determining the cause of the malfunction of the wind turbine depending on at least one of: the sensor type of the at least one sensor or the at least one measured value, wherein the cause determination includes: automatically creating a first list including at least one possible cause of the malfunction depending on at least one of the sensor type of the at least one sensor and the at least one measured value; and automatically creating a second list including a sequence of at least two steps for handling the malfunction, wherein a first step of the second list is based on a cause selected from the first list and a second step of the second list is automatically determined based on a result of the first step.

In another aspect, a method for repairing a wind turbine is provided. The method includes: determining a malfunction of the wind turbine by receiving at least one value of at least one sensor and comparing the at least one value with at least one reference, and determining depending from the result of the comparison whether a malfunction of the wind turbine is present; automatically creating a first list of at least one possible cause for the malfunction depending on at least one of the sensor type of the at least one sensor, the at least one measured value, or the result of the comparison; and, automatically providing a sequence of at least two subsequent instructions to service personnel, wherein the subsequent instruction is automatically selected from a second list depending on the result when the previous instruction is executed.

In yet another aspect, a system for operating a wind turbine is provided. The system includes: (a) a first controller adapted to monitor the wind turbine including: receiving at least one value of at least one sensor, comparing the at least one value with at least one reference, and determining depending on the comparison between the at least one value with at least one reference whether a malfunction of the wind turbine is present; (b) a second controller adapted to determining the cause depending on at least one of: the sensor type of the at least one sensor or the at least one measured value, wherein the cause determination includes automatically creating a first list including at least one possible cause of the malfunction depending on at least one of the sensor type of the at least one sensor or the at least one measured value, and automatically creating a second list including a sequence of at least two steps for handling the malfunction, wherein a first step of the second list is based on a cause selected from the first list and a second step of the second list is automatically determined based on a result of the first step.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Due to the simplified and less sensitive method and system, the method according to embodiments disclosed herein enables a better cause detection. Unnecessary steps for the cause detection may be left out. Further, the method according to embodiments disclosed herein is time saving and more effective. Thus, a service technician may control more wind turbines in a shorter period of time. Processes for each issue may be defined such that an increased trouble shooting quality is provided and less rework has to be done. Further, the trouble shooting can be done by even uneducated personal or those with lower technical knowledge because most or all data may be gathered automatically out of different sources and used for finding the root cause for a fault or malfunction.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
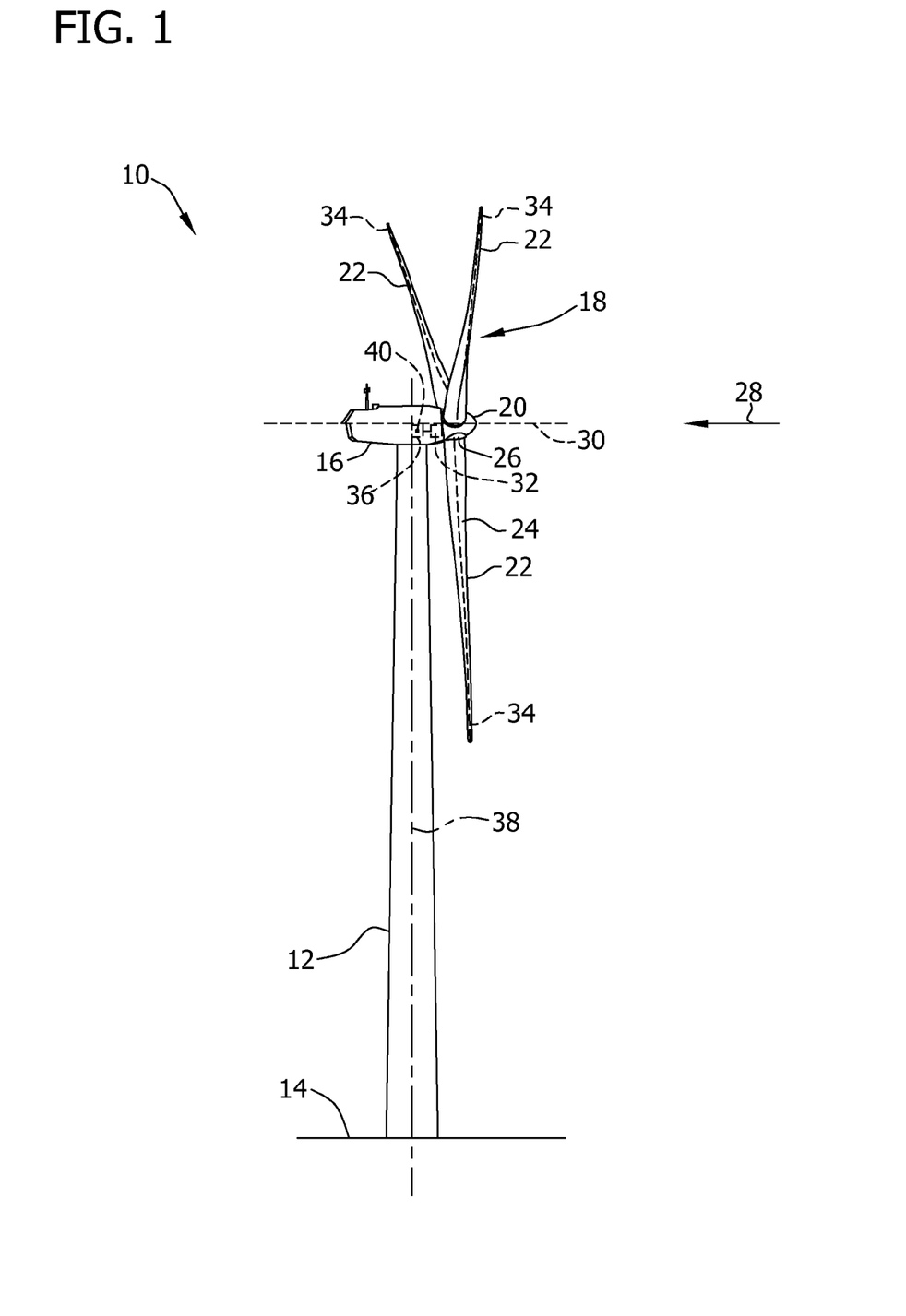
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28. The control system may drive a pitch drive 68, which includes a sensor 70.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
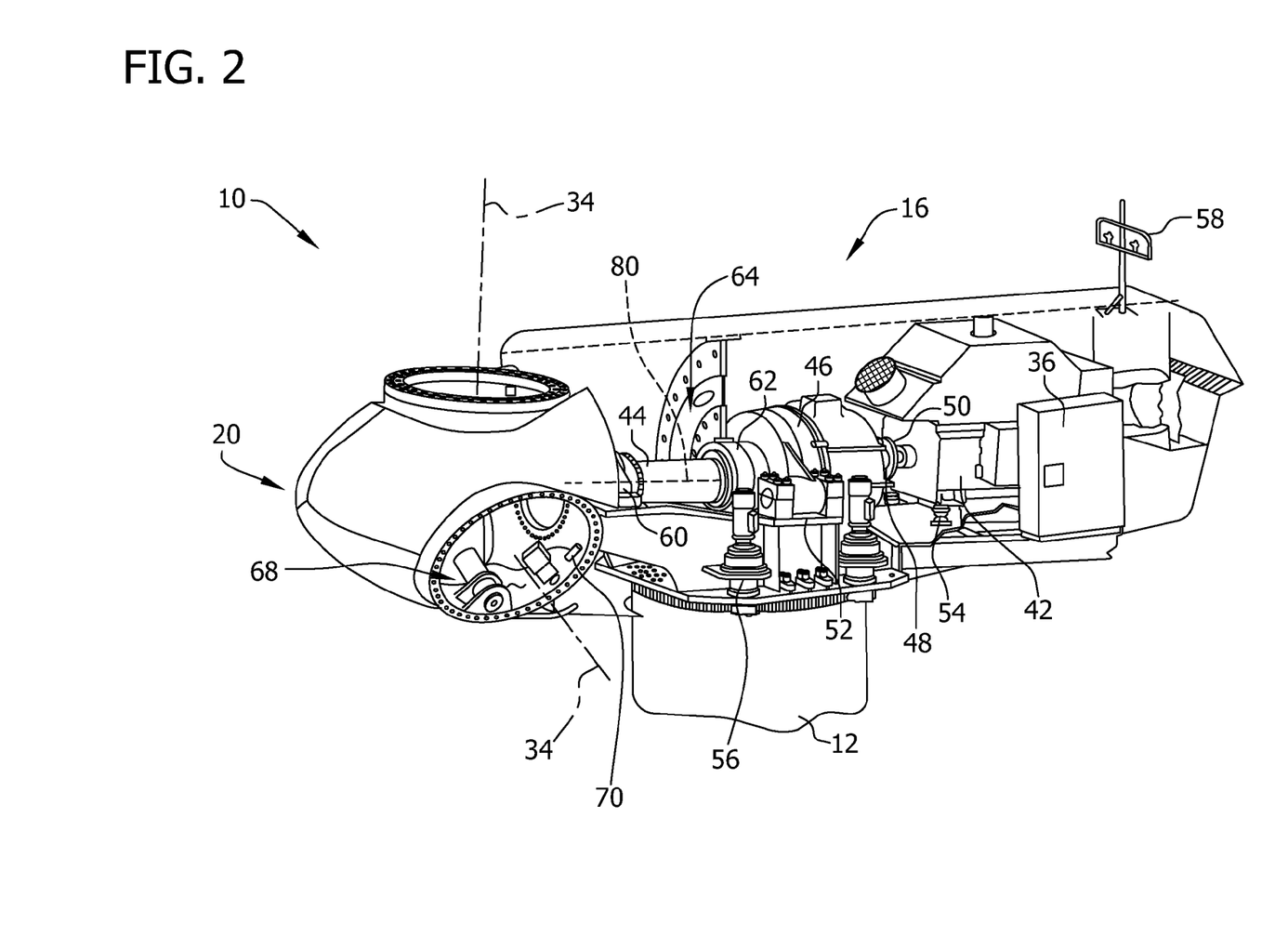
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 80. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and an anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, controllers of the wind turbine is or are a real-time controller that include any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 102 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome.

Figure 3:
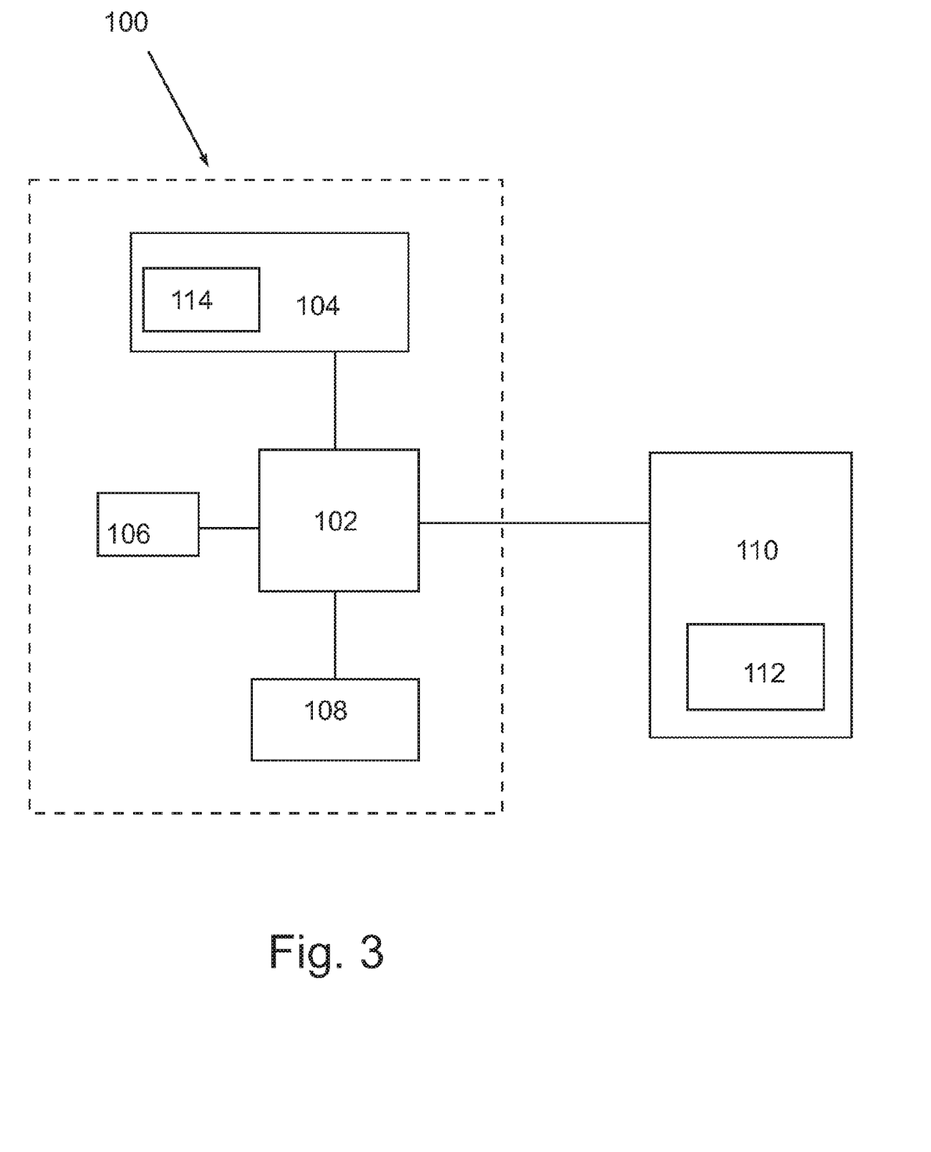
FIG. 3 is a schematic drawing of a system for determining a cause of a malfunction of a wind turbine according to an embodiment.

FIG. 3 shows a schematic drawing of an embodiment of a system 100 for operating a wind turbine. The dashed line may indicate the part of the system, which may be located at the site of the wind turbine, for example in the wind turbine, e.g. in the nacelle and/or in the tower. The system includes a fault handling apparatus 102 which is connected to one or more controllers 104 of a wind turbine. For example, the controller of the wind turbine may be processor 40 of FIG. 1. The fault handling apparatus 102 and the controller 104 may be, in an embodiment, formed by a single device. In other embodiments, the controller of the wind turbine may be arranged remotely from the fault handling apparatus. For example, the fault handling apparatus may be located in the root of the tower 12, whereas the controller 104 may be located in the nacelle 16. In other embodiments, the fault handling apparatus 102 may be located in the wind turbine or remote from the wind turbine. For example, the fault handling apparatus may be integrated to a remote control center of the wind turbine or a control panel of a wind farm.

The fault handling apparatus 102 may be connected to one or more sensors 106. Examples of sensors are: a sensor for determining the rotating angle of the wind rotor or the high speed shaft, a strain gauge for determining the bending of the tower of the wind turbine or the bending of the wind rotor shaft. Other sensors may be used for determining the pitch angle, the wind speed, the temperature inside or outside the wind turbine, the oil temperature of a gearbox, and/or the wind direction. For example, one of the sensors may determine created amount of energy or output current of an inverter of the generator.

In an embodiment, the fault handling apparatus 102 is connected to one or more output devices, for example at least one display or a loud speaker. Other output devices may be a printer. The output device may enable a service personnel to get information from the fault handling apparatus 102. The fault handling apparatus may be connectable to a remote control center 110. For example, the fault handling apparatus may be able to establish a dial up connection or an internet connection to the remote control center 110 and communicate with the remote control center 110. The remote control center 110 and the controller 104 may respectively include databases 112, 114 with wind turbine parameters. For example the databases 112, 114 may include historical wind turbine parameters or reference parameter for the wind turbine.

Wind turbine parameters may be the rotational speed of the wind turbine, the pitch angle, the jaw angle, the bending of the rotor shaft, the pending of the tower, the wind speed, the outside temperature, gear box temperature, generator temperature, the energy created by a generator in the wind turbine, and/or operational parameters of further wind turbines in vicinity of the wind turbine, where a fault or a malfunction has been detected.

Figure 4:
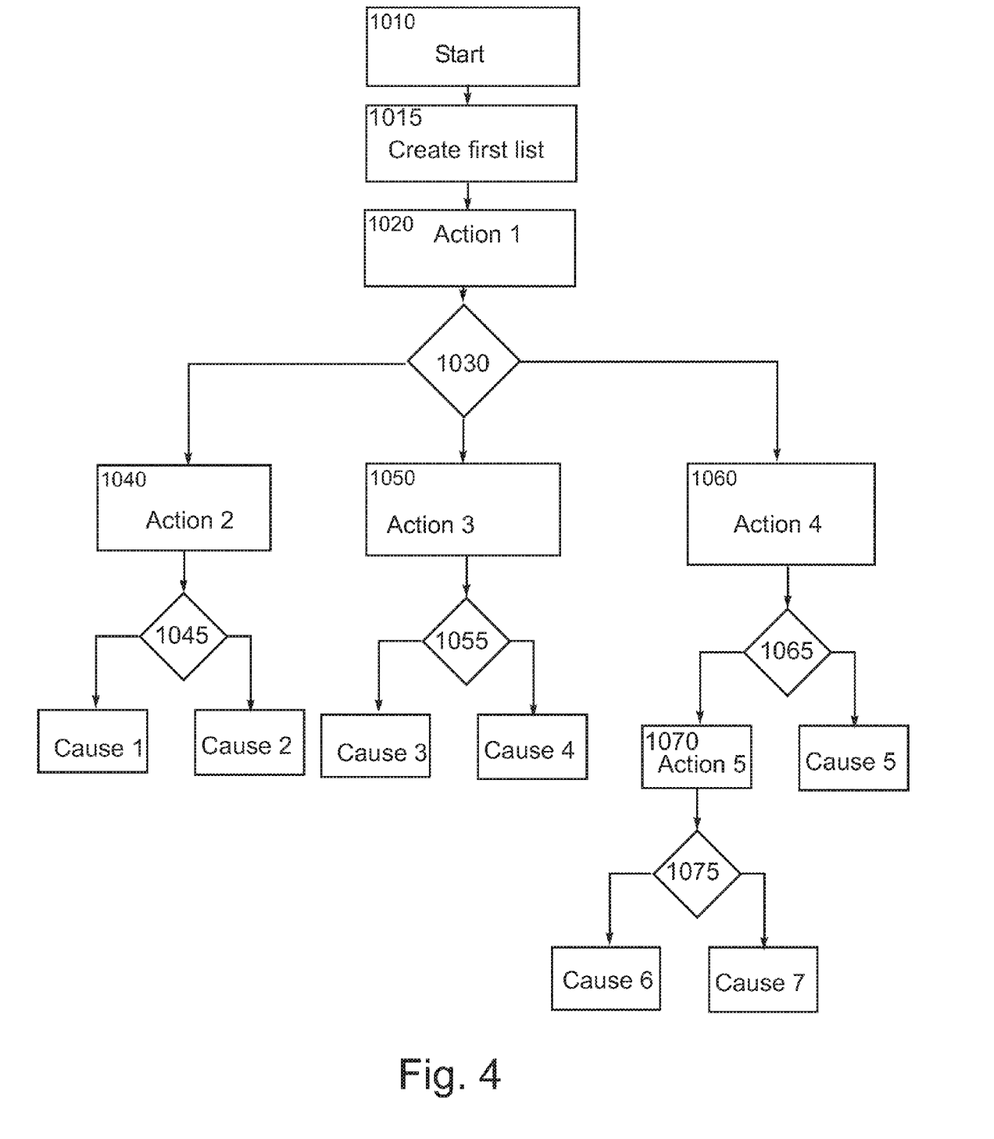
FIG. 4 is a flow chart of a method according to an embodiment.

FIG. 4 shows a flowchart of a method according to an embodiment of determining a cause of a malfunction of a wind turbine. In other embodiments, the flow chart may also be used for repairing a wind turbine.

The flow chart starts after a malfunction is detected. For example, a malfunction may be detected by comparing a sensor value to a reference or a reference value. In an example, the sensor value may be an error message. In another embodiment, the sensor value may be compared to a threshold value or a range. A sensor value below or, in another example, above the threshold value, or outside the range may indicate a malfunction. The reference typically depends on the sensor. For example, the sensor value may be compared with a reference value stored in one of the databases 112, 114.

In a first step, box 1010, a fault handling procedure is started. A first list with the possible causes that may have caused the malfunction depending on the sensor value and/or the sensor type is automatically provided, see box 1015. The first list may be sorted by a specific priority parameter, for example the probability that the cause is at the root of the malfunction. In other embodiments, the priority parameter may depend on the impact that a specific cause may have on energy production or a likelihood of severe damage to the wind turbine due to that cause. Depending on the number of sensor values and/or sensor types available the list may have less or more entries. Thus, the error may be faster determined if more sensor values are available.

Then, depending on the fault with a highest priority parameter, a first action is carried out, see box 1020. In FIG. 4 only one possible first Action is shown. However, also other first actions may be provided for faults with a lower priority, which have to be checked later, in case the fault with the highest priority has not caused the malfunction.

For example, if the fault that the power produced is lower than normal for a specific wind, the next step may be to check whether the gear box is working properly.

For example, the first action may be a request in the database about the present wind turbine parameters, historical wind turbine parameters, wind turbine parameters of adjacent wind turbines, measurement of signals, outside temperature, wind speed, response to send signals on specific electrical connections, response to a change of a switch, a measurement whether a short circuit or an open circuit exist as a specific electrical connection, the frequency of the fault, and/or the oil temperature in the gear box.

In embodiments of the method or the system, multiple data sources for active diagnostic procedures may be used to allow simple and effective trouble shooting and detection of a cause of a malfunction. For example, the following data sources may be used:

relevant internal data out of a software, like current parameters settings, life values like wind speed or temperatures, internal machine states and other internal values,
global database for parameter settings, and
historical data out of a global database.

For example, a database can store a main root cause for each fault and give to the user an advice at the end of a method according to an embodiment disclosed herein. Thus, the fault handling may depend on historical data. In some embodiments, the historical data may include historical data from other wind turbines.

Further, embodiments may include search and test procedures which may be triggered manually or automatically by the method. A test procedure may be the switch signal, for example to turn on a contactor, and look for a feedback signal.

In box 1030, the fault handling procedure of the fault detection device decides depending on the result of the first action which further action has to be carried out in a next step. Thus, a second list of possible actions may be automatically generated. In FIG. 4 three possible subsequent actions are provided, namely in box 1040 action 2, in box 1050 action 3 and in box 1060 action 4.

For example, action 2 may to be carried out as a first option, action 3 may be carried out as a second option and action 4 may be carried out as a third option. The priority, which of the actions 2, 3 and 4 may be the first to be carried out may depend on the priority of the cause that may have caused the malfunction.

Depending on the result of action 2, the fault handling apparatus may determine in box 1045 whether a cause 1 or cause 2 has caused the malfunction in the wind turbine, which has to be fixed. For example, if the gear box temperature is too low, the result may be that the oil is too old. The, the oil in the gear box has to be replaced. Thus, similar steps may be used in a method for repairing a wind turbine that guides a service technician through steps that has to be performed.

The result of action 3 may be treated in an embodiment similar to the result of action 2, such that it may be determined in box 1055 whether cause 3 or cause 4 has caused the malfunction in the wind turbine. Depending on the result of action 4 the method may decide in box 1065 that a further action 5 has to be carried out or that a cause 5 has caused the malfunction in the wind turbine. Action 5 may be similar to the previously described actions or in action 5, the fault handling apparatus may display a message on the output device 108 that the personal has to carry out a specific task, for example switching on or off a specific switch or to provide a measurement, whether a short circuit is present in a specific connection. The result of action 5 may be communicated to the fault handling apparatus by inserting it using a keyboard or another input device, like a touch screen.

In box 1075 it is then decided depending on the result of action 5, whether cause 6 or cause 7 has caused the malfunction that is present in the wind turbine. In other embodiments, the method may include more than one interactive step, in which a user or a technician is invited to provide results of a specific action.

The embodiment shown in FIG. 4 shows an decision tree. However, depending on the cause or the results of each action one branch of the decision tree may be connected to another branch of the decision tree, such that different path in the beginning may join in a later action.

In embodiments, the malfunction and the respective fault leading to the malfunction may be stored in a database. Thus, the method may automatically learn from previous faults. The result of the fault handling procedure may be also provided to a fault handling apparatus of another wind turbine or wind turbines of another wind farm. Hence, the fault handling procedure may be automatically adapted depending on the faults occurring.

A fault database used by the fault handling apparatus may include also a probability of a cause which has caused a specific malfunction. Then, the fault handling apparatus may first determine with one or more actions whether a cause or root cause with a high probability has caused this malfunction. In subsequent steps, the fault handling apparatus may perform one or more actions whether a cause with a lower probability has caused this malfunction. Hence, the time used for the trouble-shooting may be reduced.

A method for an automated or interactive fault handling procedure is provided which is supported by the affected device itself. As an example, for an effective device a wind turbine is provided in the present invention, but it may apply also to other technical devices.

Existing fault handling procedures are enhanced by using a tool and supporting hard- and software from a device, which has to be inspected. Further, existing manual procedures may be stored in the fault handling device, which may access most of the necessary data of the effected device. For example, the fault handling device according to embodiments disclosed herein may access additional data for troubleshooting, for example internal information like internal variable values, which normally may be not displayed, for example by the output device 108. Faults may be handled, which may not be auto reset.

The method and/or the device according to embodiments disclosed herein may improve the fault handling procedures by making them interactive. In the following, a further exemplary embodiment is given, however the implementation may be done in multiple ways. For example, the fault handling apparatus may connect automatically to a data base of a remote center 110 and displaying the frequency of a fault and judging about the next step. Then, the fault handling apparatus may check the safe state of the wind turbine and set a specific parameter. Further, the fault handling apparatus may give a reset and judge about the next step.

The fault handling apparatus may include in embodiments a knowledge base containing known faults and may learn or trained about new faults and their root causes.

The fault handling apparatus may be able to automate some fault handling procedures completely and provide the real root cause for example to the remote control center.

Embodiments disclosed herein may be used to do a full automated trouble shoot process or an interactive process of interaction if a technician is required or the behavior of the machine is affected.

A fully automated process may be used in a method where no interactive action is required and to create a better diagnostic compared to an analysis only done by a service technician. In embodiments, the method may be part of the control software itself, for example of the control software of the wind turbine. A fully automated trouble shoot process would be possible for all faults where the trouble shoot process doesn't effects the current behavior of the machine (for example get data out of historical databases, check parameters settings, check internal signals). An interactive process may be used if the user has to check something manually, for example a connection, whether there is ice on the rotor blades, and/or has to start a manual test procedure.

With the method according to embodiments disclosed herein and a system according to embodiments disclosed herein, trouble shooting may be faster and more effective. Also the procedure may be done by someone with lower technical knowledge because most or all data may be gathered automatically from different sources and be used for finding the root cause of the fault.

For example, in an embodiment, at least one of the steps is selected depending on a cause with the highest priority parameter.

In an embodiment, the priority of a cause causing a malfunction depends on the probability of that cause to cause the detected malfunction.

In an embodiment, the first step or steps of the cause determination is/are selected to determine, whether the cause with the highest priority has caused the detected malfunction. The priority of a cause causing a malfunction may depend on the probability of that cause to cause the detected malfunction. The probability may depend on malfunctions and their causes of other wind turbines. In some embodiments, the priority may depend on the risk that a further damage, for example a more severe damage, may occur.

In an embodiment, the method may include: storing the determined cause and the detected malfunction in a database. For example, in an embodiment, the priority of a cause related to the detected malfunction in the database is adapted. The probability may change with each malfunction which can be related to a specific cause.

For example, in an embodiment, the at least one value is at least one of: an error message of a sensor; and, a measured value; and/or the at least one reference is at least one of: a threshold value; an interval; and, historical data. For that purpose, the fault handling apparatus or controller may be connected to the respective sensor.

In an embodiment, which may be combined with other embodiments disclosed herein, at least one step of the cause determination includes at least one of: resetting at least one controller of the wind turbine; retrieving at least one historical operational parameter from a parameter setting database; retrieving at least one reference operational parameter from a database; retrieving at least one actual operational parameter of the wind turbine, and comparing the at least one operational parameter with a reference parameter; retrieving the priority of at least one cause and the respective cause provoking the malfunction, wherein the priority depends on the at least one previous step; and, triggering at least one test signal, and detecting at least one response signal of the at least one test signal. For example, the at least one historical operational parameter, the at least one actual operational parameter, or the at least one reference operational parameter is related to the detected malfunction.

In a typical embodiment, which may be combined with other embodiments disclosed herein, at least one step of the cause determination includes: providing at least one instruction to a service personnel depending on at least one of the result of the previous step or the determined malfunction. For example, in an embodiment, the second controller is adapted to provide automatically in at least one step of the cause determination the at least one instruction to a service personnel.

In an embodiment, which may be combined with other embodiments disclosed herein, the at least one instruction is at least one of: switching a manual contactor; checking a specific wire connection; triggering a switch; and, checking the mechanical condition of the wind turbine or a portion of the wind turbine.

In an embodiment, which may be combined with other embodiments disclosed herein, the first controller and the second controller are provided in a single device or controller. In an embodiment, at least one of the first controller or the second controller is remotely arranged from the wind turbine. For example, in an embodiment, the second controller is adapted to establish a data connection to the wind turbine.

Exemplary embodiments of systems and methods for determining a cause of a malfunction of a wind turbine are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, the wind turbine comprising a control system, the method comprising:
   detecting a malfunction of the wind turbine by:

receiving in the control system at least one value of at least one sensor, the control system being configured to:
compare the at least one value with at least one reference;
depending on the comparison between the at least one value with the at least one reference, detect whether a malfunction of the wind turbine is present; and
determining a cause of the detected malfunction of the wind turbine depending on at least one of the sensor type of the at least one sensor and the at least one value, wherein determining the cause of the detected malfunction comprises:
automatically creating a first list of possible causes of the detected malfunction depending on at least one of the sensor type of the at least one sensor and the at least one value, the first list being sorted by a priority parameter;
carrying out a first action based on a cause from the first list having a highest priority parameter;
determine a result of the first action and whether further action is needed based on the result of the first action; and, if further action is needed;
automatically creating a second list of further actions based on the result of the first action, the second list being sorted by the priority parameter; and
determining which of the causes on the first list caused the malfunction from the results of one or more of the further actions.

2. The method according to claim 1, wherein the priority parameter is a probability that a cause in the first list is a cause of the detected malfunction, an impact of the cause on energy production, or a likelihood of severe damage to the wind turbine due to the cause.

3. The method according to claim 1, wherein detecting whether a malfunction is present also includes eliminating the malfunction.

4. The method according to claim 1, wherein determining the cause of the malfunction includes:
providing at least one instruction to service personnel depending on at least one of the result of the first action or the cause of the detected malfunction.

5. The method according to claim 1, further comprising:
storing the determined cause of the malfunction and the detected malfunction in a database.

6. The method according to claim 1, wherein the at least one value is an error message of a sensor or a measured value.

7. The method according to claim 1, wherein the at least one reference is a threshold value, an interval, or, historical data.

8. The method according to claim 1, determining the cause of the malfunction includes at least one of:
resetting at least one controller of the control system of the wind turbine;
retrieving at least one historical operational parameter from a parameter setting database;
retrieving at least one reference operational parameter from a database;
retrieving at least one actual operational parameter of the wind turbine, and
comparing the at least one operational parameter with a reference parameter;
retrieving the priority of at least one cause and the respective cause provoking the malfunction, wherein the priority depends on the at least one previous step;
triggering at least one test signal, and detecting at least one response signal of the at least one test signal.

9. The method according to claim 5, further comprising: adapting the priority parameter of a cause related to the detected malfunction in the database.

10. The method according to claim 8, wherein the at least one historical operational parameter, the at least one actual operational parameter, or the at least one reference operational parameter is related to the detected malfunction.

* * * * *